United States Patent [19]

Aizaki

[11] Patent Number: 4,620,087

[45] Date of Patent: Oct. 28, 1986

[54] INITIALIZE CONTROL SYSTEM IN A CASH PROCESSING SYSTEM

[75] Inventor: Yoshihiko Aizaki, Kawasaki, Japan

[73] Assignee: Fujitsu Limited, Kawasaki, Japan

[21] Appl. No.: 677,138

[22] Filed: Nov. 30, 1984

[30] Foreign Application Priority Data

Nov. 30, 1983 [JP] Japan ................................ 58-226388
Dec. 13, 1983 [JP] Japan ................................ 58-234510

[51] Int. Cl.⁴ ................................ G06F 15/30
[52] U.S. Cl. ................................ 235/379
[58] Field of Search ................................ 235/379

[56] References Cited

U.S. PATENT DOCUMENTS 4,355,369 10/1982 Garvin ................................ 235/379

*Primary Examiner*—Harold I. Pitts

*Attorney, Agent, or Firm*—Armstrong, Nikaido, Marmelstein & Kubovcik

[57] ABSTRACT

A cash processing system comprises: a wicket terminal having a take-out port for taking out the cash; a cashier terminal for disbursing the cash; a carrier path connecting the wicket terminal to the cashier terminal; a carrier which runs on the carrier path; and a system controller which sends cash disbursing instructions to the cashier terminal in response to a cash disbursing request from the wicket terminal, so that the carrier carries the cash disbursed by the cashier terminal. The system controller further comprises memory which stores the cash disbursing request sent from the wicket terminal; and a controller which transfers the carrier to the wicket terminal from where the cash disbursing request is executed, when initialize instructions are issued during the cash disbursement processing being executed in response to the cash disbursing request.

20 Claims, 21 Drawing Figures

INITIALIZE CONTROL SYSTEM IN A CASH PROCESSING SYSTEM

BACKGROUND OF THE INVENTION

1. Field of the Invention

The present invention relates to a cash processing system comprising an initialize control system, in which a wicket counter and a cashier machine are connected together via carrier means in a financial organization such as a bank or the like, wherein if the operation of the system is interrupted, the cash being handled is recovered when the operation of the system is initialized.

2. Description of Related Art

In recent years, the remarkable developments in office automation have enabled a great variety of work to be carried out automatically. In banks, in particular, there is a strong demand for the adoption of office automation to further enhance the reliability of cash handling operations. For this purpose, an automatic cash disbursing machine and an automatic depositing machine have been developed and are already in practical use. However, these automatic machines are installed at locations remote from the tellers wickets, and are used exclusively for depositing or withdrawing cash from an account by using a cash card. Therefore, in the interests of improving cash handling operations there is a need for the cash processing at the tellers windows to also be automated to a certain extent.

SUMMARY OF THE INVENTION

The object of the present invention is to provide a cash processing system comprising an initialize control system which, if there is an error in the operation of the system during the disbursing operation, recovers the cash being handled when the operation of the system is restored, and invalidates the operation being handled at that time.

According to the present invention, there is provided a cash processing system comprising: a wicket terminal having a take-out port for taking out the cash; a cashier terminal for disbursing the cash; a carrier path connecting the wicket terminal to the cashier terminal; a carrier which runs on the carrier path; and a system controller which sends cash disbursing instructions to the cashier terminal in response to a cash disbrusing request from the wicket terminal, so that the carrier carries the cash disbursed by the cashier terminal. The system controller further comprises memory means which stores the cash disbrusing request sent from the wicket terminal, and control means which transfers the carrier to the wicket terminal from where the cash disbursing request is executed, when initialize instructions are issued during the cash disbursement processing being executed in response to the cash disbursing request.

DESCRIPTION OF THE PREFERRED EMBODIMENTS

Figure 1:
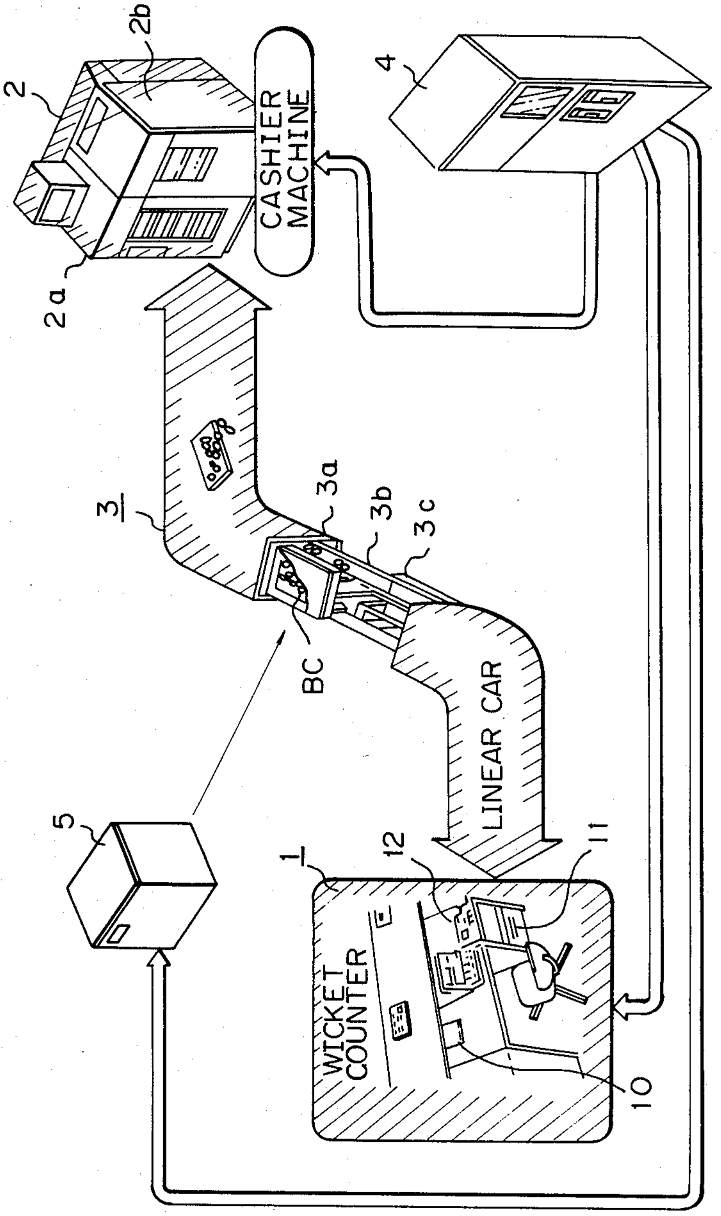
FIG. 1 is a schematic diagram of a system for processing the cash.

In the cash processing system shown in FIG. 1, wicket counter 1 and a cashier machine 2 are connected through carrier means 3. The wicket counter 1 is equipped with a cash handling port 10, a teller terminal 11, and a cash receiving machine 12 for the teller, which receives the cash. The cashier machine 2 consists of an automatic cash discharging machine 2*a* and an automatic cash holding machine 2*b*. The carrier means 3 consists of rails 3*b* that connect the cashier machine 2 to the wicket counter 1, and a linear motor car having a carrier 3*a* that moves on the rails 3*b* and a stator 3*c* that drives the carrier 3*a*. These elements are controlled by a control unit 4, and the carrier means 3 is further controlled by a linear motor controller 5.

In this wicket system, the cash receiving operation is carried out as described below. That is, the cash received by the teller from a customer through the wicket is inserted in the cash handling port 10, and placed directly on the carrier 3*a*. Data showing the amount of cash and the like is then input into the teller terminal 11. The carrier 3*a* in the wicket counter 1 is then driven on the rail 3*b* to the cashier machine 2 by the linear motor controller 5, controlled by the control unit 4, and the cash placed on the carrier 3*a* is then hold in a cash box in the automatic cash holding machine 2*b*. This operation can be carried out through the cash receiving machine 12 for teller. In this case, the cash receiving machine 12 for the teller discriminates the cash and confirms the amount of cash received. The cash is then placed on the carrier 3*a*.

The cash disbursing operation is carried out as described below. That is, as the teller inputs the disbursing instruction and the amount of disbursement from the teller terminal 11 to the control unit 4, the carrier 3*a* in the wicket counter 1 is driven on the rail 3*b* to the automatic cash discharging machine 2a. The cash corresponding to the amount discharged from the cash box of the automatic cash discharging machine 2a is placed on the carrier 3a, which moves on the rail 3b to the wicket counter 1. The teller then takes out the cash through the cash handling port 10.

According to the above-mentioned cash processing system, the cash is carried between the cash box and the wicket without the need for manual work, making is possible to alleviate the work at the wicket, to control the cash in a uniformalized manner, and to contribute to the prevention of crime. Therefore, the cash processing system can be very effectively adopted to the work of handling the cash.

According to the above automatic system, all cash handling is carried out without the need for manual handling except the handling of the cash at the wicket. In practice, however, the electric power may break down while the system is in operation or the system is reset due to erroneous operation. In such cases, the operation of the system also breaks down.

To resume operation of the system after the electric power has been restored, it is necessary to initialize the system.

The system can be initialized after the control unit 4 has checked and reset the devices that constitute the system. If the system is breaks down during the disbursing operation, however, the customer is forced to wait for the resumption of operation. To avoid such inconvenience, the cash must be handed over to the customer by hand.

If the operation of the system is resumed immediately after the system has been initialized, however, the cash to be handed to the customer is still on the carrier, and is in the process of being conveyed to the wicket station, giving rise to an undesirable problem from the standpoint of controlling the cash.

Figure 2:
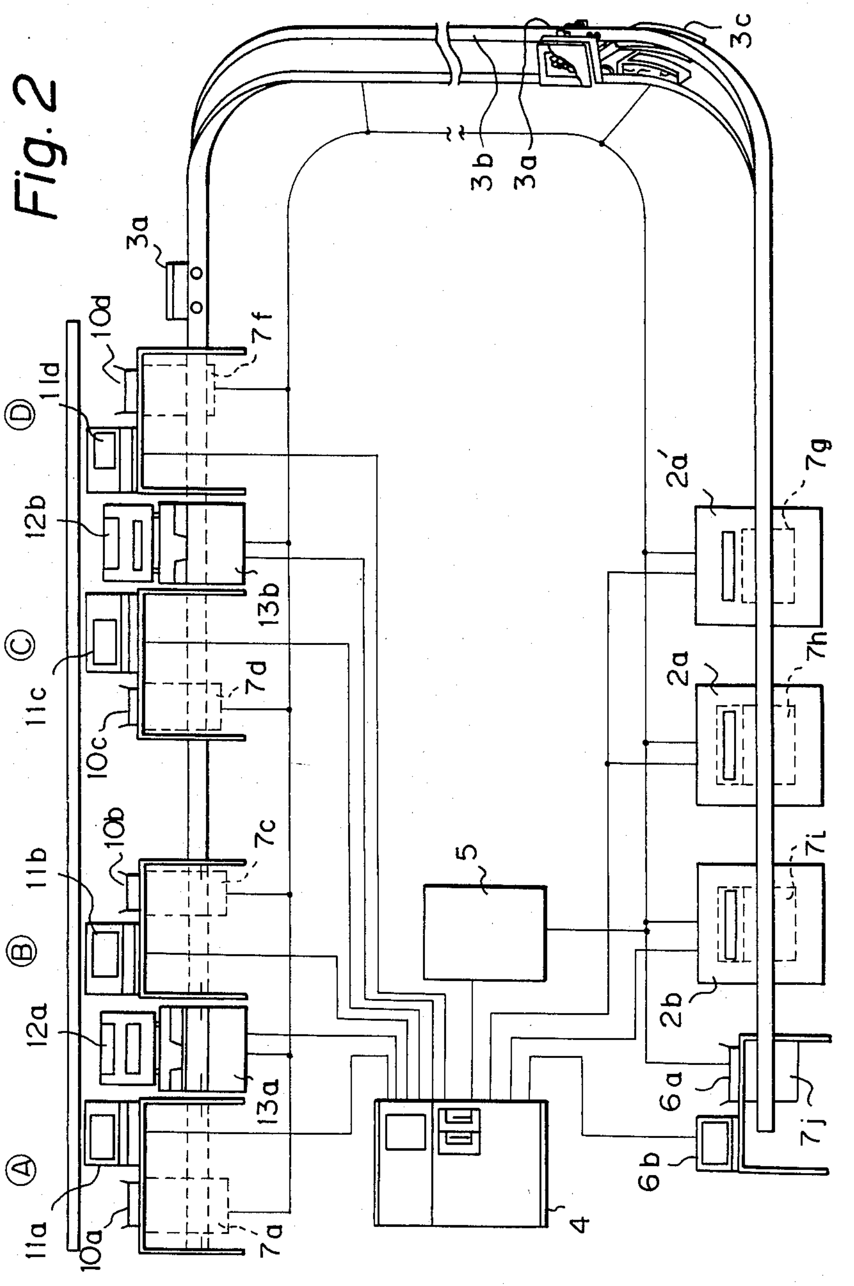
FIG. 2 is a diagram showing the whole structure of an embodiment of the present invention.
Figure 3:
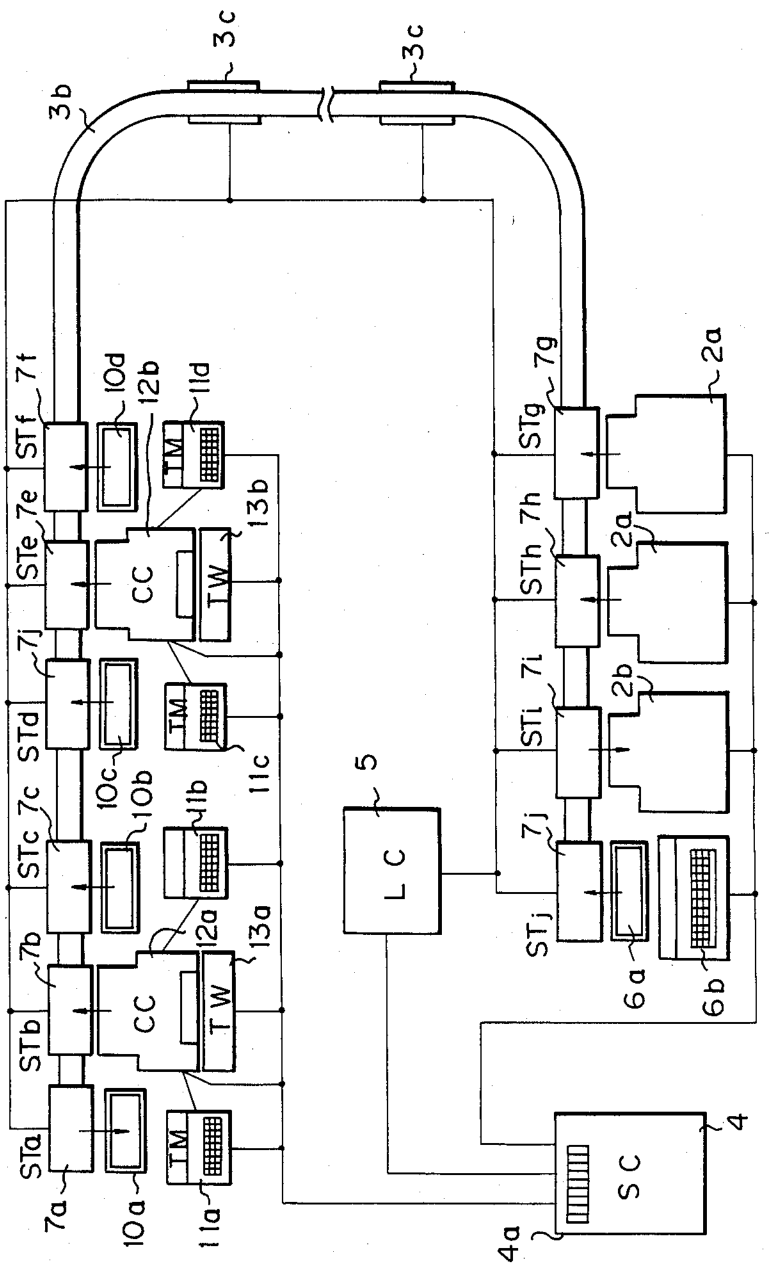
FIG. 3 is a top view of the structure of FIG. 2.

FIGS. 2 and 3 are diagrams illustrating the structure according to an embodiment of the present invention; wherein FIG. 2 is a side view, and FIG. 3 is a top view. In these diagrams, the same portions as those of FIG. 1 are denoted by the same reference numerals. Reference numeral 6a denotes a cash handling port in a cashier station, through which the cash on the carrier 3a can be taken out by hand, or the cash can be placed on the carrier 3a by hand. A cashier terminal 6b includes a display and a keyboard that will be manipulated by the teller when calculating the cash handled.

Reference numerals 7a, 7b, 7c, 7d, 7e, 7f, 7g, 7h, and 7i denote lift mechanisms (FIG. 7) which remove the carrier 3a from the rail 3c and lift it up until it is in line with the cash handling ports 10a, 10b, 10c, 10d, 6a, or the discharge port of the cash receiving teller machine, or the discharge ports of the cash discharge machines 2a, 2a', or the accommodation port of the cash holding machine 2b. After the processing is finished, the lifting mechanisms move the carrier 3a downward to place it on the rail 3c. Reference numerals 10a, 10b, 10c, and 10d denote cash handling ports at wicket counters A, B, C and D. Reference numerals 11a, 11b, 11c, and 11d denote teller terminals at the wicket counters, each having a display and a keyboard through which the data for money receiving or disbursing can be input by the wicket teller. Reference numerals 12a and 12b denote cash receiving machines for the tellers, as explained in detail with reference to FIG. 8, into which the wicket tellers at the wicket counters A, B, C and D insert the cash received. Reference numerals 13a and 13b denote terminal writers which, when a customer's bankbook is inserted thereinto, read the data (account number and the like) contained in the magnetic stripes of the bankbook, report the data to the control unit 4, record the treated amount, balance, and the like onto the bankbook or journal in accordance with the information provided from the control unit 4, and return the bankbook to the customer.

According to this structure, there are four counters A, B, C, and D equipped with cash handling ports 10a, 10b, 10c, and 10d and teller terminals 11a, 11b, 11c, and 11d, respectively. Each of the cash receiving machines 12a, 12b for tellers, and each of the terminal writers 13a, 13b are commonly used by wickets on both sides. The cashier counter comprises the presently used cash discharging machine 2a that, a spare cash discharging machine 2a', a cash holding machine 2b, and a cashier station (including cash handling port 6a and cashier terminal 6b). A rail 3b is laid from the cashier counter to the wicket counters. Along the rail 3b, a carrier 3a moves between the cashier counter and the wicket counters to carry the cash.

The structure of each of the portions will now be described below prior to explaining the operation of the structure of FIGS. 2 and 3.

Figure 4:
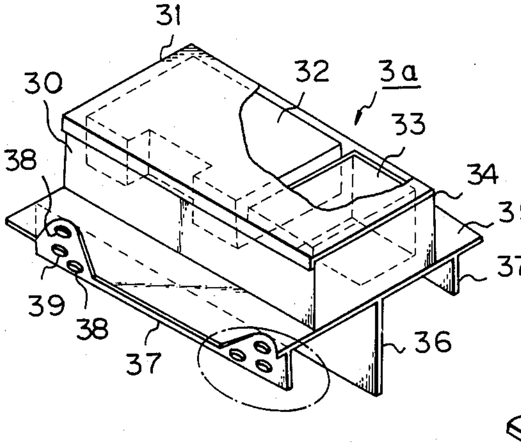
FIGS. 4, 5 and 6 are diagrams showing in detail the structure of a carrier 3*a* in the structure of FIG. 2.

FIG. 4 is a diagram showing in detail the structure of the carrier means 3, wherein reference numeral 30 denotes a vessel having a cover 31 supported by a hinge 34 so as to be opened. Reference numeral 32 denotes a bill container, and 33 denotes a coin container, for containing bills and coins, respectively, formed in the vessel 30. Reference numeral 35 denotes a base supporting the vessel 30 on the upper portion thereof and having a rotor plate 36 corresponding to the rotor of a motor at the lower central portion thereof and guide plates 37 at both lower sides thereof. Reference numerals 38 and 39 denote guide rollers provided at the front and rear portions of the guide plates 37.

Figure 5:
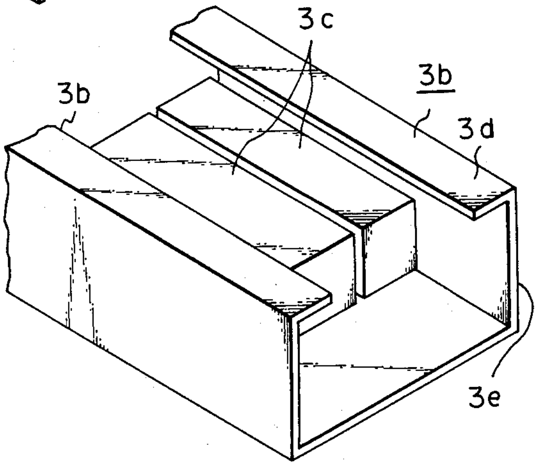

FIG. 5 shows the rail 3b in detail. The rail 3b is generally constructed in a U-shaped cross section, and has upper guides 3d and side guides 3e. Reference numeral 3c denotes stators provided under the lower surface of the rail 3b, the coils (not shown) being wound in the stators . The rotor plate 36 of the carrier 3a is placed between the pair of stators 3c. By permitting the electric current to flow into the coils, the carrier 3a is accelerated (or started), driven, or stopped when a brake (reverse current) is applied. The stators 3c are provided on the rail 3b at the positions of the lift mechanisms 7a to 7j (i.e., stations STa to STj) of FIG. 3, and at suitable positions between the stations 7f and 7g.

Figure 6:
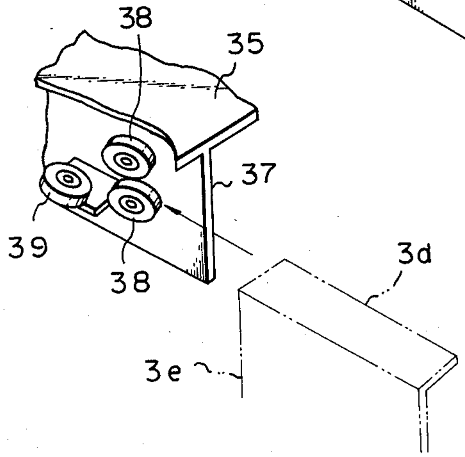

FIG. 6 shows the coupling between the carrier 3a and the rail 3b. As the carrier 3a is fitted to the rail 3b, the rotor plate 36 is positioned between the pair of stators 3c as mentioned above. In this case, the guide roller 39 of the guide plate 37 comes into contact with the inner surface of the side guide 3e of the rail 3b to guide the carrier 3a in the lateral direction. At the same time, both sides of the upper guide 3d of the rail 3b are sandwiched by a pair of guide rollers 38 of the guide plate 37 to guide the carrier 3a in the up and down directions. Thus, the carrier 3a is guided and moved along the rail 3b.

Figure 7:
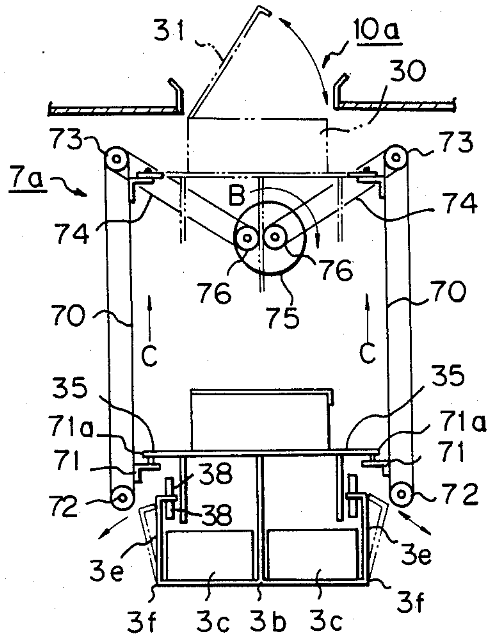
FIG. 7 is a diagram showing in detail a lift mechanism in the structure of FIG. 2.

FIG. 7 is a diagram showing in detail the structure of the lift mechanisms 7a to 7j. Only a lift mechanism 7a at the position of cash handling port 10a is illustrated: Other lift mechanisms 7b to 7j are also constructed in the same manner. In FIG. 7, reference numeral 70 denotes a lift belt provided on both sides of the carrier 3*a* and equipped with a bracket 71 having a pin 71*a* which engages with an engaging hole (not shown) formed in the base 35 of the carrier 3*a*. Reference numerals 72 and 73 denote pulleys that rotate to drive the lift belts 70, so that the carrier 3*a* engaged with pins 71*a* of brackets 71 is moved in the up and down directions, and 75 denotes a motor which rotates the pulleys 76 to drive the lift belts 70. Rotation of the pulleys 76 is transmitted to the pulleys 73 through belts 74 to drive the lift belts 70. Reference 3*f* denotes a hinge provided only at the positions of stations where the lift mechanism is provided. The hinge 3*f* turns the side guide 3*e* of the rail 3*b* to disengage the upper and side guides 3*d* and 3*e* of the rail 3*b* from the guide rollers 38 and 39 of the carrier 3*b*; i.e., to unlock the carrier 3*b*.

Accordingly, the carrier 3*a* runs on the rail 3*b* and arrives at a desired station, and is stopped at this position by the braking force of the stator 3*c*. The lift belts 70 then move upwards to some extent, so that the pins 71*a* of brackets 71 engage with the base 35 of the carrier 3*a*. The side guide 3*e* is turned by an unlocking mechanism (not shown) about the hinge 3*f*, whereby the rail 3*b* is liberated, the carrier 3*a* is unlocked, and the lifting operation is carried out by the lift belts 70. Thereafter, the motor 75 runs to drive the lift belts 70, and the carrier is upwardly driven and positioned under the cash handling port 10*a*. This position is a base position for the carrier 3*a*. In FIG. 3, six carriers 3*a* are provided, i.e., one carrier for each of the stations STa to STf. When not in use, the carriers stay at the base positions (corresponds to refuge lines) in the stations.

After the lifting operation is completed, the liberated rail 3*b* is restored to the initial state, and is used for other carriers 3*a*. When the carrier 3*a* is to be used, the rail 3*b* is liberated, the carrier 3*a* is lowered by the lift belts 70 onto the rail 3*b* which then restores the initial state, and guide rollers 38, 39 of the carrier 3*a* are engaged with the upper and side guides 3*d* and 3*e* of the rail 3*b*. The lift belts 70 are further lowered to liberate the engagement between the pins 71*a* of brackets 71 and the engaging holes of the base 35, whereby the carrier 3*a* is liberated to run on the rail 3*b*.

Figure 8:
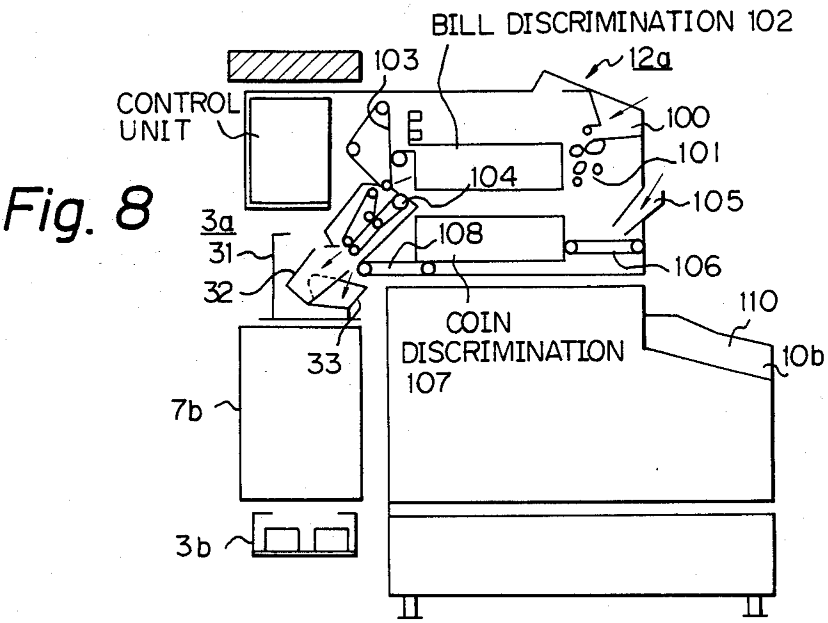
FIG. 8 is a diagram showing in detail a cash receiving machine for the teller in the structure of FIG. 2.

FIG. 8 is a diagram illustrating in detail the cash receiving machine 12*a* for the teller and the terminal writer 13*a*. Reference numeral 100 denotes a bill insertion port through which will be inserted the bills received by the wicket teller from a customer; 101 denotes a bill separating portion which separates the bills inserted into the bill insertion port 100 into individual pieces and sends them to a bill discriminating portion 102, which discriminates the bills sent from the bill separating portion; 103 denotes a bill returning portion which upwardly returns bills, discriminated by the bill discriminating portion 102 as counterfeit from the bills in the primary pool; and 104 denotes a bill discharging portion having the primary pool at the upper position thereof to pool the bills that are discriminated as genuine, and discharges the bills in the primary pool into the bill container 32 of carrier 3*a* at the home position. Reference numeral 105 denotes a coin insertion port through which are inserted the coins received by the wicket teller from a customer; 106 denotes a coin sending portion which sends the coins inserted into the coin insertion port 105 into a coin discriminating portion 107, which discriminates the coins sent by the coin sending portion; and 108 denotes a coin discharging portion which discharges coins discriminated by the coin discriminating portion 107 as genuine into the coin container 32 in the carrier 3*a*. The coins discriminated by the coin discriminating portion 107 as counterfeit are returned to a coin returning port via a coin guide. Reference numeral 110 denotes a bankbook/slip insert port through which the wicket teller inserts a bankbook or a slip received from a customer. The inserted bankbook or slip is sent to a registering machine where it is registered, and is then returned to the insert port 110.

Figure 9:
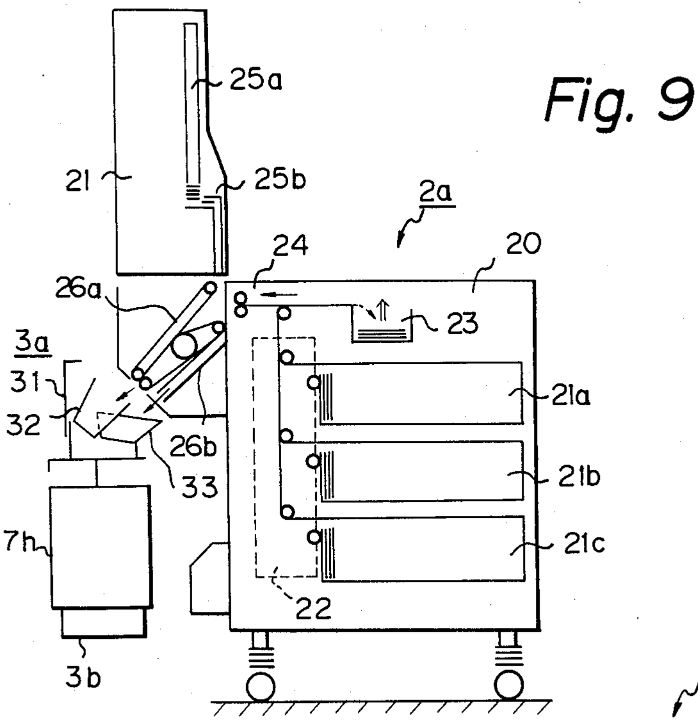
FIG. 9 is a diagram showing in detail a cash discharging machine in the structure of FIG. 2.

FIG. 9 is a diagram showing in detail the structure of the cash discharging machine 2*a* which consists of a bill discharging portion 20 and a coin discharging portion 21. In FIG. 9, reference numerals 21*a*, 21*b* and 21*c* denote bill holding portions (cash boxes) that holds bills of different denominations, respectively; reference numeral 22 denotes a bill take-out portion which takes out bills of an instructed number of pieces and instructed amount from the bill holding portions 21*a*, 21*b*, and 21*c*; 23 denotes a primary pool in which are pooled the bills that are taken out by the bill take-out portion 22; and 24 denotes a bill sending portion which sends the bills in the primary pool batchwisely to the bill discharging portion 20. Reference 25*a* denotes a coin holding portion (cash box) which holds the coins; 25*b* denotes a coin discharging portion in which the coins of an instructed number of pieces and amount are taken out from the coin holding portion 25*a* to pool them temporarily and then sends the coins to the coin discharging portion. Reference 26*a* denotes a bill discharging portion where the bills sent by the bill sending portion are discharged into the bill container 32 of the carrier 3*a* raised by the lift mechanism 7*h*; and 26*b* denotes a coin discharging portion where the coins sent from the coin take-out portion 25*b* are guided and discharged into the coin container 33 in the carrier 3*a*.

Figure 10:
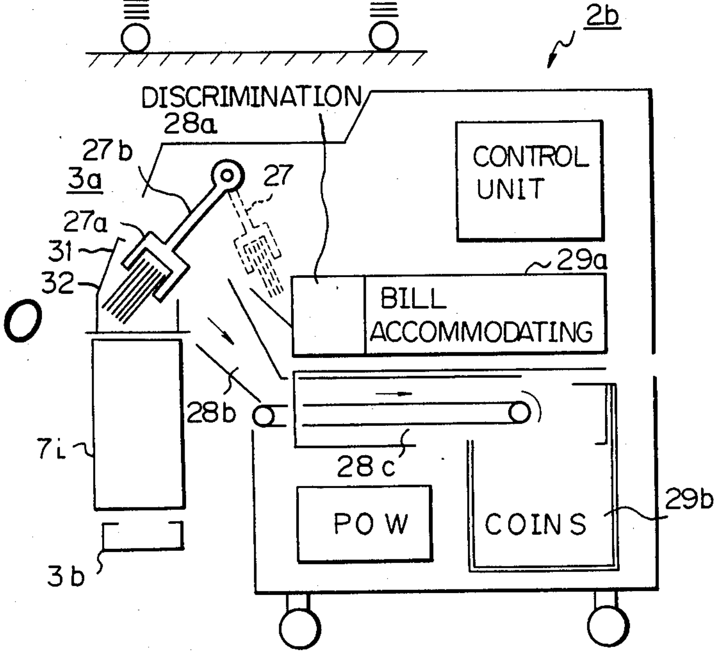
FIG. 10 is a diagram showing in detail a cash holding machine in the structure of FIG. 6.

FIG. 10 is a diagram showing in detail the structure of the cash holding machine 2*b*, wherein reference numeral 27 denotes a bill take-out robot having a hand 27*a* and an arm 27*b*. The bills in the bill container 32 of the carrier 3*a* are held by the hand 27*a*, and the arm 27*b* is turned to guide the bills held by the hand 27*a* to the insertion port of the discriminating portion. Reference 28*a* denotes a bill discriminating portion which discriminates the bills inserted therein by the robot 27; 29*a* denotes a bill holding portion (cash box) which holds the bills discriminated to be genuine by the bill discriminating portion 28*a*. The bills discriminated by the bill discriminating portion 28*a* as counterfeit are recovered in a reject box (not shown). Reference 28*b* denotes a coin receiving portion which receives and guides the coins inserted therein, when the coin container 33 of the carrier 3*a* is tilted; 28*c* denotes a coin sending portion which sends the coins received by the coin receiving portion 28*b* to the coin holding portion; and 29*b* denotes a coin holding portion (cash box) which holds the coins sent from the coin sending portion 28*c*.

Figure 11:
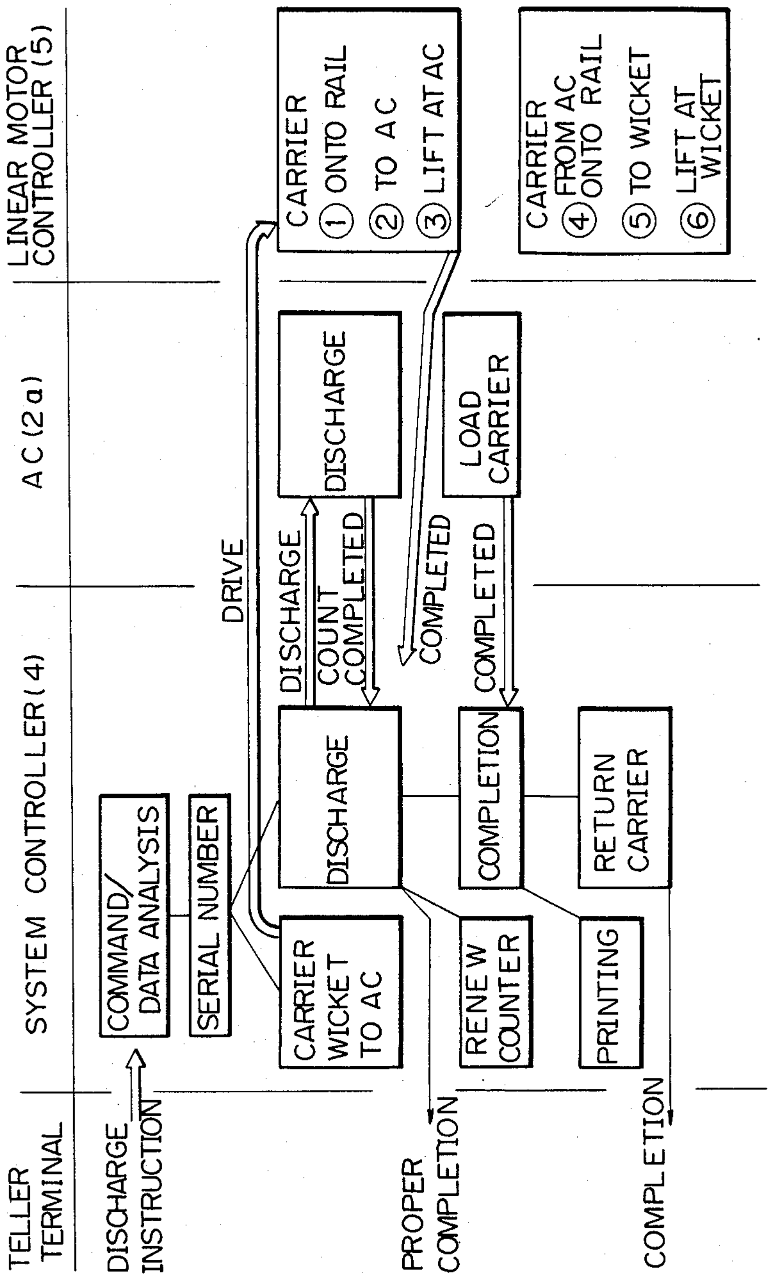
FIG. 11 is a flowchart of the operation for processing the cash disbursment in the structure of FIG. 2.
Figure 12:
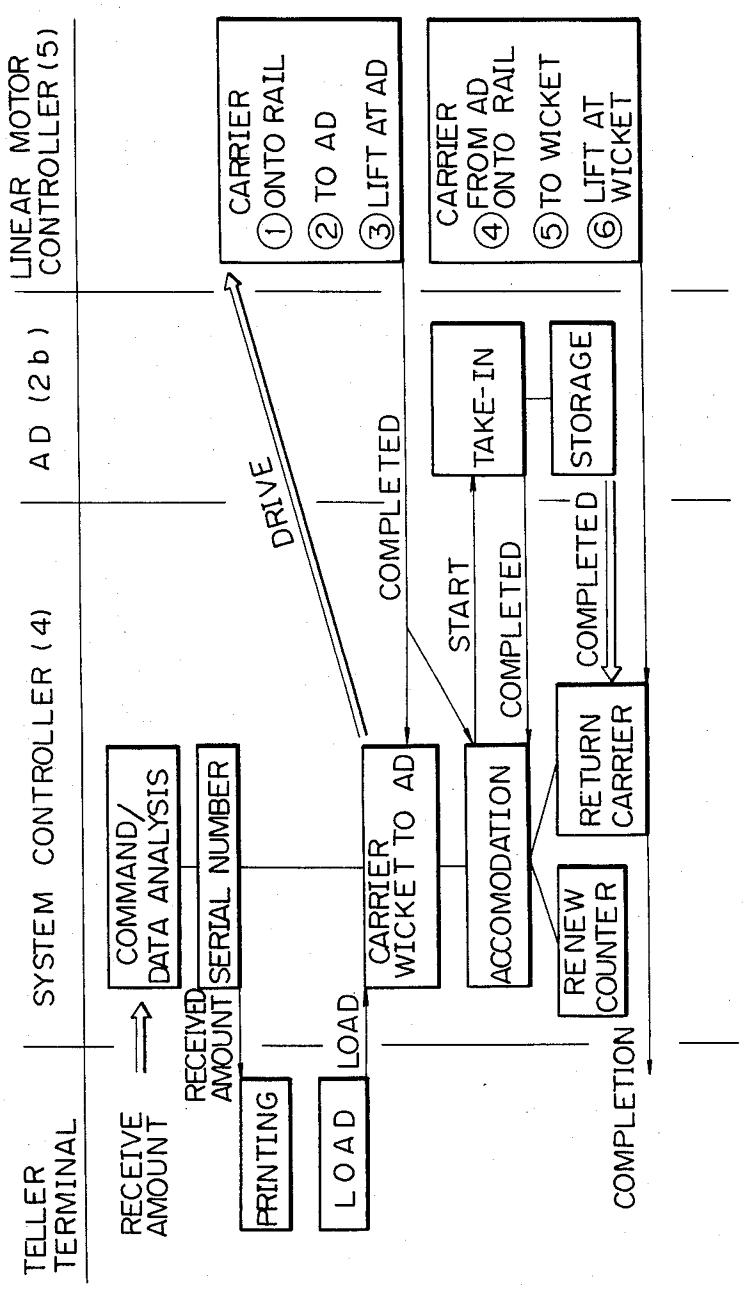
FIG. 12 is a flowchart of the operation for processing the cash receiving in the structure of FIG. 2.

Operation of the embodiment of FIGS. 2 and 3 will now be described below in conjunction with a flowchart of the operation of the disbursement processing of FIG. 11 and a flowchart of the operation of the cash receiving processing of FIG. 12. Here, symbols STa, STb, STc, STd, STe, and STf represent wicket stations, each having the carrier 3*a* waiting at the base position, symbols STg, STh represent AC stations, STi represents an AD station, and STj represents a cashier station.

First, the disbursement processing of FIG. 11 will be described.

(1) The wicket teller receives a slip for requesting disbursement and a bankbook from a customer, and inputs bill/coin insertion instructions consisting of disbursement instructions and amount of disbursement through a teller terminal (e.g., 11a) at the wicket. The insertion instructions are sert to the system control unit (SC) 4, which also receives the contents of the magnetic stripes of the bankbook that are read when the bankbook is inserted into the terminal writer (e.g., 13a) by the wicket teller. The system control unit 4 then determines (command/data analysis) whether the transactions can be carried out by consulting the host computer. If the transactions are allowable, the control unit 4 establishes a serial number for disbursement processing. This serial number is then used as a discrimination number, and the processing is carried out under this number.

(2) The control unit 4 instructs the linear motor controller 5 to move the carrier 3a waitng at the wicket station (e.g., STa) to the AC station STh. For instance, the control unit 4 issues drive instructions such that the wicket station STa is a departure station and the AC station STh is an arrival station. At the same time, the control unit 4 sends instructions to the cash discharging machine 2a to discharge the requested amount of money.

(3) Therefore, the linear motor controller 4 drives the lift mechanism 7a (FIG. 7) at the wicket station STa, so that the carrier 3a is lowered from the base position to place it on the rail 3b. Then, the stator 3c at the wicket station STa is energized to start the carrier 3a. The linear motor controller 5 detects the position of the carrier 3a, relying upon outputs of the sensors (not shown) provided at a predetermined intervals along the rail 3c, and successively energizes the stators 3c at the points where the carrier 3a moves along on the rail 3b. Arrival of the carrier 3a at the AC station STh is detected by the output of the sensor, whereby the stator 3c at the AC station STh is reversely energized to stop the carrier 3a at that position. Further, the linear motor controller 5 drives the lift mechanism 7h at the AC station STh to raise the carrier 3a from the rail 3b. Thereafter, the linear motor controller 5 informs the control unit 4 of the completion of the processing.

(4) Upon receipt of the instructions to discharge the money, the cash discharging machine initiates the discharging operation. That is, as illustrated with reference to FIG. 9, predetermined bills are taken out by the take-out portion 22 from the bill holding portions 21a, 21b, and 21c and are pooled in the primary pool 23. Similarly, the coins are taken out by the take-out portion 25b from the coin holding portion 25a and are pooled. After the bills and coins are taken out and counted, the control unit 4 is informed of the completion of the count.

(5) Upon receipt of the completion of the counting and processing, the control unit 4 detects the completion of the loading preparation and informs (proper completion) the teller terminal 11a, which displays this information to the wicket teller.

(6) Then, the control unit 4 renews the counter of the disbursement amount in the internal memory. At the same time, the completion processing is performed to load the cash on the carrier. That is, the control unit 4 sends loading start instructions to the cash discharging machine 2a. As the carrier 3a is raised by the lift mechanism 7h to the lower portion of the discharging portions 26a and 26b, the cover 31 is opened as illustrated in FIG. 9 by a cover drive mechanism (not shown), whereby the bill container 32 is turned so as to easily accept the bills. The coin container 33 is also tilted forward to easily accept the coins. In response to the loading start instructions, the cash discharging machine 2a drives the bill sending portion 24 and the bill discharging portion 26a, so that the bills in the primary pool 23 are discharged and loaded onto the bill container 32 in the carrier 3a. Similarly, the coin take-out portion 25b is driven, so that the coins in the primary pool are sent to the coin discharging portion 26b, and discharged and loaded onto the coin container 33. When the loading is finished, the completion information is reported to the control unit 4.

(7) The control unit 4 controls the terminal writer 13a to register the bankbook inserted therein. The bankbook is then returned to the insertion port 110.

(8) At the same time, the control unit 4 performs the processing to return the carrier. The control unit 4 issues to the linear motor controller 5 drive instructions such that the departure station is the AC station STh and the arrival station is the wicket station STa. Thereupon, the linear motor controller 5 drives the lift mechanism 7h at the AC station STh. That is, the cover 31 of the carrier 3a is closed by the cover drive mechanism (not shown), and the carrier 3a is lowered onto the rail 3b. Then, the linear motor controller 5 drives the stator 3c at the AC station STh to start the carrier 3a. In a same manner as mentioned above, the linear motor controller 5 successively drives the stators 3c at points where the carrier passes along on the rail 3b, so that the carrier 3a runs along the rail 3b. As the carrier 3a arrives at the wicket station STa, the stator 3c at the wicket station STa is reversely excited to stop the carrier 3a at that position. The linear motor controller 5 then drives the lift mechanism 7a at the wicket station STa to raise the carrier 3a from the rail 3b to its base position. Then, the cover drive mechanism (not shown) of the lift mechanism 7a is driven to open the cover 31 of the carrier 3a.

The linear motor controller 5 reports the completion of the operation to the control unit 4 which then reports the completion of operation to the teller terminal 11a, where it is displayed to the wicket teller. The wicket teller then takes out, through the cash handling port 10a, the bills and coins loaded on the bill container 32 and coin container 33 of the carrier 3a as shown in FIG. 7.

(9) The wicket teller also takes out the registered bankbook from the insert port of the terminal writer 13a and hands it to the customer together with the cash, thereby completing the disbursing operation.

The processing for receiving cash will be described below in conjunction with FIG. 12.

(a) The wicket teller receives from a customer cash, a deposit slip, the cash and a bankbook, and inputs the received amount to the control unit 4 through the teller terminal (e.g., 11a) at the wicket. The control unit 4 further receives the contents of the magnetic stripes of the bankbook, that are read when the bankbook is inserted by the wicket teller into the terminal writer (e.g., 13a), and determines (command/data analysis) whether the transaction can be carried out by consulting the host computer. If the transactions are allowable, the control unit 4 establishes a serial number for processing the received money. This serial number is then used as a discrimination number to execute the processing.

(b) Next, the control unit 4 issues a deposit notice to the teller terminal 11*a*, and registers the bankbook inserted in the terminal writer 13*a*. The wicket teller inserts the cash received from the customer into insertion ports 100 and 105 (FIG. 8) of the cash receiving machine 12*a*. In the cash receiving machine 12*a* as described with reference to FIG. 8, the bills and coins are discriminated by the discriminating portions 102 and 107, counted, and pooled in the primary pools. Through the discrimination operation, the amount of cash inserted displayed at the teller terminal 11*a* so that the wicket teller can confirm the amount of cash inserted. When this agrees with the amount to be deposited, the wicket teller inputs an approval signal through the teller terminal 11*a*. Then, the cash in the primary pool is discharged through the discharge portion 104 into the bill container 32 and coin container 33 of the carrier 3*a* with its cover 31 open, and the loading of the cash is then completed. The control unit 4 is then informed of the completion of the loading.

(c) Upon receipt of the loading completion information, the control unit 4 instructs the linear motor controller 5 to move the carrier 3*a* at the station STb of the wicket (CC) to the AD station STj. That is, the control unit 4 issues drive instructions such that the departure station is CC station STb and the arrival station is AD station STi.

(d) The linear motor controller 4 works so that the cover 31 is closed by the cover drive mechanism (not shown) of the lift mechanism 7*a* at the CC station STb, and the carrier 3*a* is lowered from the home position onto the rail 3*b*. Next, the stator 3*c* at the CC station STb is energized to start the carrier 3*a*. The linear motor controller 5 detects the position of the carrier 3*a* relying upon the outputs of sensors (not shown) provided at predetermined intervals along the rail 3*c* to successively energize the stators 3*c* at points where the carrier 3*a* passes over along the rail 3*b*, so that the carrier 3*a* runs therealong.

Arrival of the carrier 3*a* at the AD station STi is detected by the output of the sensor, whereby the stator 3*c* at the AD station STi is reversely excited to stop the carrier 3*a* at that position. The linear motor controller 5 further drives the lift mechanism 7*i* at the AC station STi, so that the carrier 3*a* is raised from the rail 3*b*. The linear motor controller 5 then informs the control unit 4 of the completion of the processing.

(e) Upon receipt of the completion of the processing, the control unit 4 initiates the processing for holding. That is, the control unit 4 sends taking instructions to the cash holding machine (AD) 2*b*. As the carrier 3*a* is raised by the lift mechanism 7*i* to a position under the robot 27, the cover 31 is opened by the cover drive mechanism (not shown) as illustrated in FIG. 10, whereby the bill container 32 is turned to easily accept the bills. The coin container 33 is also tilted forward to easily accept the coins. In the cash holding machine as described with reference to FIG. 10, the robot 27 takes out the bills from the bill container 32 and puts them into the insertion port of the bill discriminating portion 28*a*. Similarly, the coin container 33 is tilted by a coin taking mechanism (not shown), so that the coins are inserted into the coin receiving portion 28*b*. After the taking operation is finished, the cash holding machine 2*b* informs the control unit 4 of the completion of the taking operation.

(f) As the taking operation is finished, the control unit 4 performs the processing to return the carrier. The control unit 4 issues drive instructions to the linear motor controller 5 such that the departure station is the AD station STi and the arrival station is the CC station STb. Therefore, the linear motor controller 5 drives the lift mechanism 7*i* at the AD station STi. Namely, the cover 31 of the carrier 3*a* is closed by the cover drive mechanism (not shown), and the carrier 3*a* is lowered onto the rail 3*b*. Then, the linear motor controller 5 energizes the stator 3*c* at the AD station STi to start the carrier 3*a*. In a same manner as mentioend above, the linear motor controller 5 successively energizes the stators 3*c* at points where the carrier passes over on the rail 3*b*, so that the carrier 3*a* runs along the rail 3*b*. As the carrier 3*a* arrives at the CC station STb, the stator 3*c* at the CC station STb is reversely excited to stop the carrier 3*a* there. The linear motor controller 5 then drives the lift mechanism 7*b* at the CC station STb to raise the carrier 3*a* from the rail 3*b* to its base position. Further, the cover drive (not shown) of the lift mechanism 7*b* is driven to open the cover 31 of the carrier 3*a*. The linear motor controller 5 then informs the control unit 4 of the completion of the operation, which then informs the teller terminal 11*a*.

(g) After the taking operation mentioned above, the cash holding machine 2*b* operates the bill discriminating portion 28*a* to discriminate the bills at the insertion port and holds them in the holding portion 29*a*. Similarly, the coin sending portion 28*c* is driven, so that the coins thrown into the coin receiving portion 28*b* are held in the coin holding portion 29*b*.

The cash receiving operation is thus completed.

the operation of receiving or disbursing the cash, the power supply may break down, which will cause the operation of the system to break down. In such a case, the entire operation is stopped, and it is impossible to carry out the operation for receiving or disbursing the cash by using the system. Therefore, the entire operation for receiving or disbursing the cash has to be continued by hand for some period of time, so that the customers are not obliged to wait for the restoration of the system.

In the cash disbursing operation, however, when the system is restored and the disbursement processing once interrupted is resumed, the cash of an amount already disbursed by manual operation arrives at the wicket station. That is, since the transactions have been already finished, the wicket teller finds the cash not to be disbursable, and a problem arises from the standpoint of controlling the cash. Therefore, the cash being handled is not transferred to the wicket station but is recovered.

Figure 13:
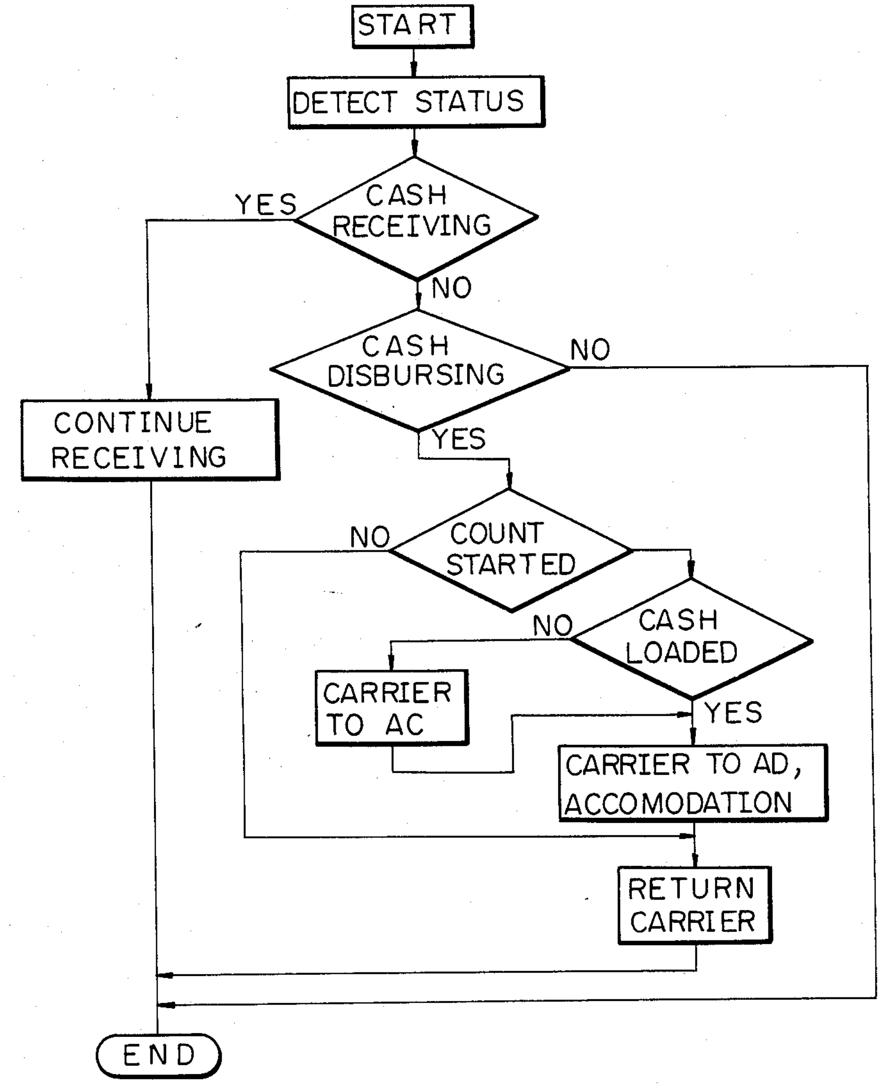
FIG. 13 is a flowchart of a cash processing operation according to an embodiment of the present invention.

FIG. 13 is a flowchart of the initialize processing carried out after an ordinary initial processing (checking and resetting of individual devices).

The control unit 4 has a status memory 4*a* (FIG. 3) in its internal memory to sequentially store the operation conditions of each of the devices. When the power supply is interrupted, the data is stored in a nonvolatile memory together with data of other transactions, and is read out when the power supply is restored. The status memory 4*a* stores the process modes (cash is being received or disbursed) and the operation modes (carrier is being moved, loaded, returned, taken in, or counted). Through the communications with the linear motor controller 5, cash discharging machine 2*a*, and cash accommodating machine 2*b*, described with reference to FIGS. 11 and 12, the control unit 4 detects and stores these modes.

Based upon the process mode stored in the status memory 4*a*, the control unit 4 determines whether the cash is under a receiving proceeding or not. When the cash is under a receiving proceeding, the control unit 4 inspects the operation mode, and executes the cash receiving operation from the point at which the operation was interrupted, in the same manner as the aforementioned cash receiving operation under proper conditions.

When the cash is not under a receiving proceeding, the control unit 4 determines whether the cash is under disbursing proceeding or not, relying upon the process mode. When the cash is not under a disbursing proceeding, nothing has been processed, and therefore the operation is finished.

When the cash is under a disbursing proceeding, the control unit 4 determines the operation mode of the status memory 4*a*. As mentioned above, if the cash discharging machine 2*a* is not equipped with a reject mechanism, as shown in FIG. 9, it becomes necessary to separately recover the cash when the system has broken down after counting of the cash is started. Therefore, the control unit 4 determines the operation mode. If the system has broken down after the cash has been counted, the control unit 4 further examines the operation mode to determine whether the break-down has occurred after the cash is loaded onto the carrier. If the break-down occurs before the cash is loaded onto the carrier, the carrier 3*a* has not still arrived at the AC station STh, i.e., the carrier 3*a* is running somewhere between the wicket station and the AC station STh. Therefore, the control unit 4 instructs the linear motor controller 5 so that the carrier 3*a* arrives at the AC station STh, where the counted cash is loaded onto the carrier 3*a* from the cash discharging machine 2*a*.

When the cash has been loaded or when it is determined that the cash has been loaded, the control unit 4 instructs the linear motor controller 5 so that the carrier 3*a* runs from the AC station STh to the AD station STi. Or, when the carrier 3*a* loaded with the cash is in a return movement, the control unit 4 instructs the linear motor controller 5 so that the carrier 3*a* runs to the AD station STi.

In a same manner as described in (e) above with regard to the cash receiving, the cash in the carrier 3*a* is put (recovered) into the reject box in the cash holding machine 2*b* in accordance with the instructions from the control unit 4. In this case, the output of the discriminating portion 28*a* is forcibly considered as a bogus bill detect signal to put (recover) the cash into the reject box. When the cash holding machine 2*b* does not have a reject box, the cash may be put (recovered) into the holding portions. Or the cash may be put (recovered) into the reject box without passing through the discriminating portion.

After the recovery operation, the carrier 3*a* is returned to the wicket station in a same manner as described in (f) above with reference to the cash receiving processing. Similarly, if the counting has not yet been started, the carrier 3*a* is returned to the wicket station, and the processings are invalidated.

Figure 14:
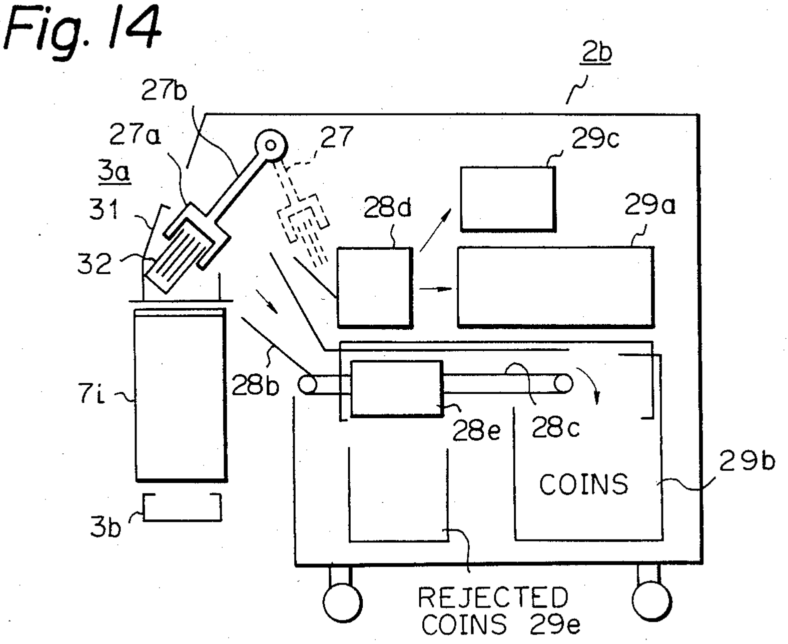
FIGS. 14 and 15 are diagrams showing in detail the structure of a cash holding machine in the structure of FIG. 2 according to other embodiments of the present invention.

In the foregoing has been described an embodiment wherein the cash holding machine 2*b* is equipped with a discriminating device. The invention, however, can be realized even when the cash holding machine 2*b* is not equipped with the discriminating device. FIG. 14 is a diagram showing in detail the structure of a cash holding machine not provided with a discriminating device, in which the same portions as those of FIG. 10 are denoted by the same reference numerals. In FIG. 14, reference numerals 28*d* and 28*e* denote switching portions; and 29*c* and 29*e* denote reject boxes exclusively provided for the recovery purpose. In the recovery operation, all the recovered bills and coins are distributed by the switching portions 28*d* and 28*e* and put into the exclusive reject boxes. Therefore, they can be distinguished from the ordinary received cash, and can be easily controlled.

Figure 15:
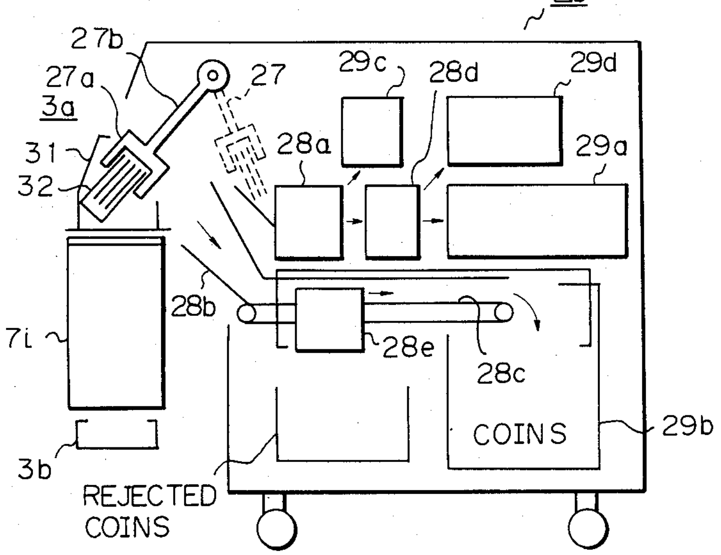

Even in the structure of FIG. 10, exclusive reject boxes can be used. FIG. 15 is a diagram showing a cash holding machine according to a further embodiment, wherein the same portions as those of FIGS. 10 and 14 are denoted by the same reference numerals, and 29*d* denotes a reject box provided for the cash received ordinarily. In the recovery operation according to this embodiment, all the recovered bills and coins are distributed by the switching portions 28*a* and 28*e* and put into the exclusive reject boxes 29*c* and 29*e*, respectively. In ordinarily receiving the cash, on the other hand, the bills are sent to the discriminating portion 28*d* via the switching portion 28*a*. The bills judged to be genuine are held in the holding portions 29*a*, and the bills judged to be counterfeit are put into the reject box 29*d* for received cash. The coins are contained in the holding portion 29*b* via the switching portion 28*e*.

The above-mentioned embodiments deal with the cash discharging machine 2*a* that is not provided with a reject mechanism. However if a reject mechanism is provided, the cash should be recovered into its own reject box when the cash has not yet been loaded onto the carrier at the time of initializing the system, and the cash should be recovered into the cashing holding machine 2*b* only when the cash has already been loaded onto the carrier. That is, when the step of "cash loaded" is NO in the flow chart of FIG. 13, the cash is recovered by the reject mechanism of the cash discharging machine 2*a*, and the carrier is returned.

The cash is recovered by using the cash holding machine 2*b* that is ordinarily used for receiving the cash. However, a separate recovering machine can be used for recovering the cash for this purpose.

Figure 16:
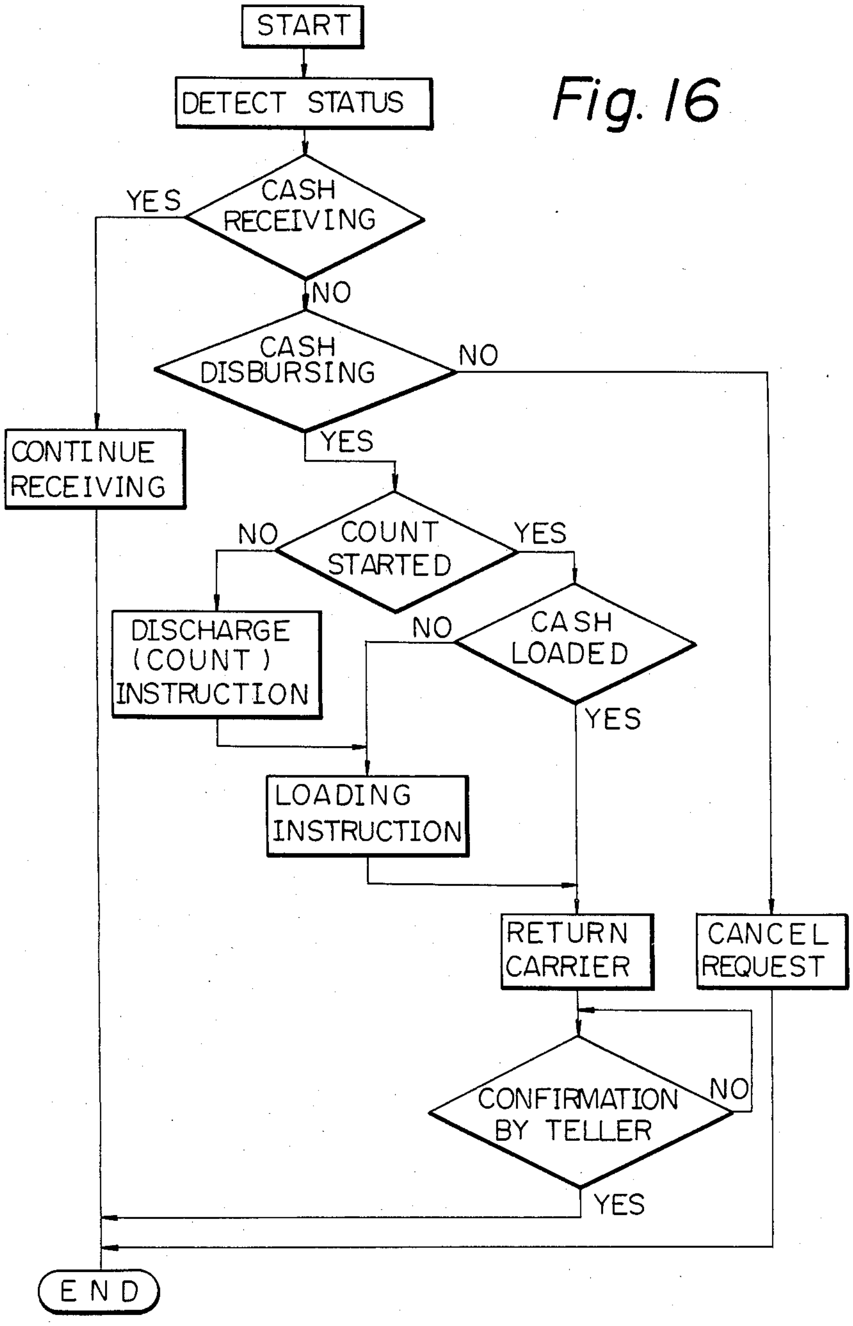
FIG. 16 is a flowchart of a cash processing operation according to another embodiment of the present invention.

In the embodiment of FIG. 16, when the cash is being neither received nor disbursed, it is judged that no cash is being handled in the system. The control unit 4 therefore cancels (clears) the data in the status memory 4*a* and finishes the initialize processing.

If the process mode is that wherein the cash is being disbursed, the control unit 4 further examines the operation mode of the status memory 4*a*. The control unit determines the stage of progress in the disbursement processing, executes the subsequent processing in the disbursement processing, and completes the processing. That is, when the operation mode indicates that the cash has not yet been counted, the control unit 4 sends discharge instructions to the cash discharging machine 2*a* to discharge the cash in an amount corresponding to the data requested, and executes the subsequent disbursement processing. When the operation mode indicates that the cash has been counted but not loaded yet onto the carrier, the control unit 4 sends the loading start instructions to the cash discharging machine 2*a*. Further, when the operation mode indicates that the cash has already been loaded, the control unit 4 executes the processing to return the carrier. Consequently, the cash being handled is properly loaded onto the carrier and is carried to the wicket station from where the request was made. As the carrier arrives at the wicket station, the cover is opened via the lift mechanism as described above, so that the cash can be taken out by the wicket teller.

The wicket teller takes out the cash from the carrier, and depresses a cover closure button (not shown) to close the cover of the carrier. When the cover is closed, a detect mechanism (not shown) sends a cash take-out confirmation signal to the control unit 4. Upon receipt of the confirmation signal, the control unit 4 judges that the initialize processing of the system is finished.

Figure 17:
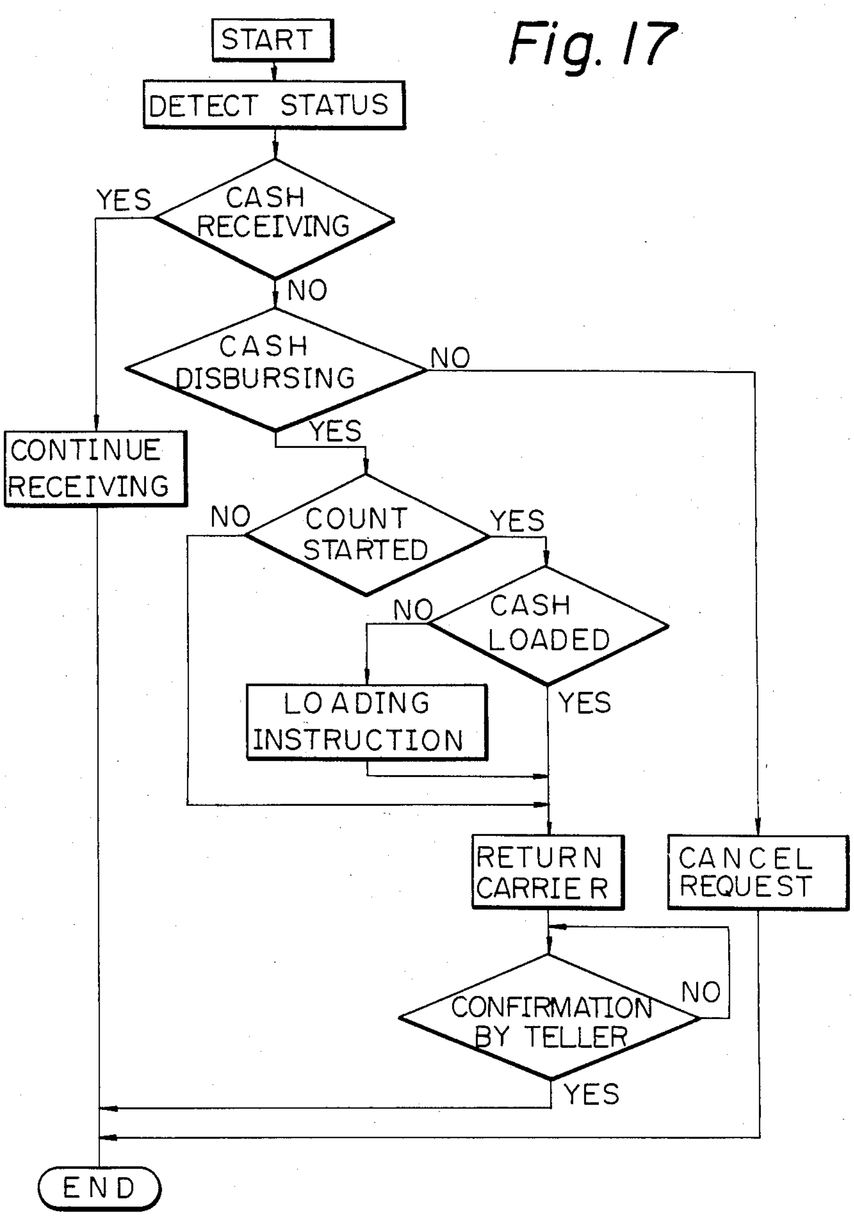
FIG. 17 is a flow chart of a processing according to a further embodiment of the present invention.

FIG. 17 is a flowchart of the initialize processing according to a further embodiment. According to this embodiment, the disbursement processing is cancelled when the system is broken down even under the condition where the cash discharging machine 2*a* is not performing the counting operation. That is, when the operation mode of the status memory 4*a* in the control unit 4 indicates that the counting has not been started yet, it means that the carrier 3*a* is placed on the rail 3*b* or at the AC station STh. In this case, the control unit 4 does not perform the cash discharging operation for the carrier 3*a*, but returns the carrier to the wicket station from where the request was made. In a same manner as the aforementioned cases, the carrier 3*a* is raised by the lift mechanism to the cash handling port 10*a* where the cover 31 is opened. At this moment, the wicket teller makes sure that no cash is present on the carrier 3*a*, and depresses the closure button. Therefore, the cover 31 is closed, and the carrier 3*a* is located at the base position in the same manner as described above. At the same time, the closure detect signal is sent as a confirmation signal to the control unit 4.

According to the embodiments of FIG. 16 and 17 as described above, if the system is broken down, the initialize processing works to return the carrier 3*a* to the initial wicket station. Accordingly, all the cash being handled can be recovered by the wicket teller.

Figure 18:
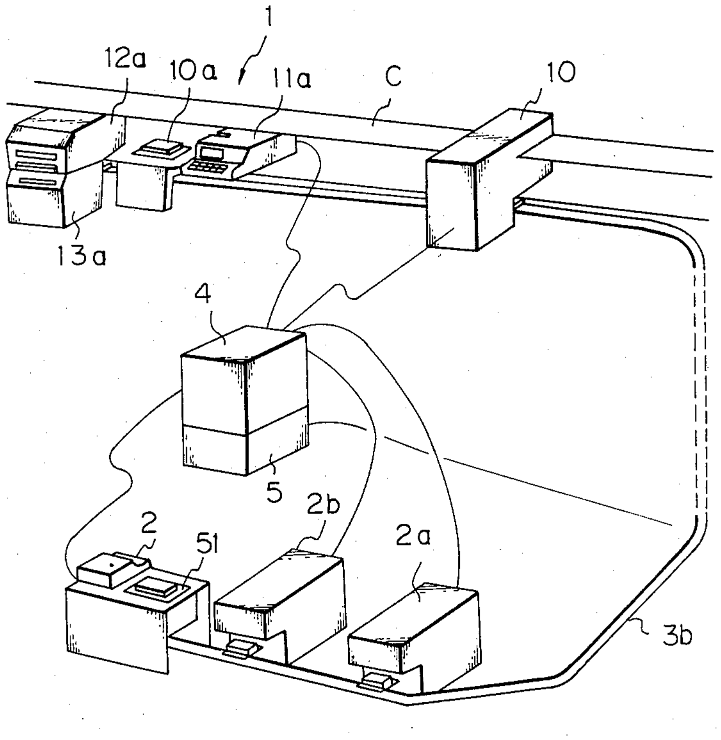
FIGS. 18 and 19 are diagrams illustrating an embodiment of a cash processing system according to the present invention including an automatic transaction apparatus 10.
Figure 19:
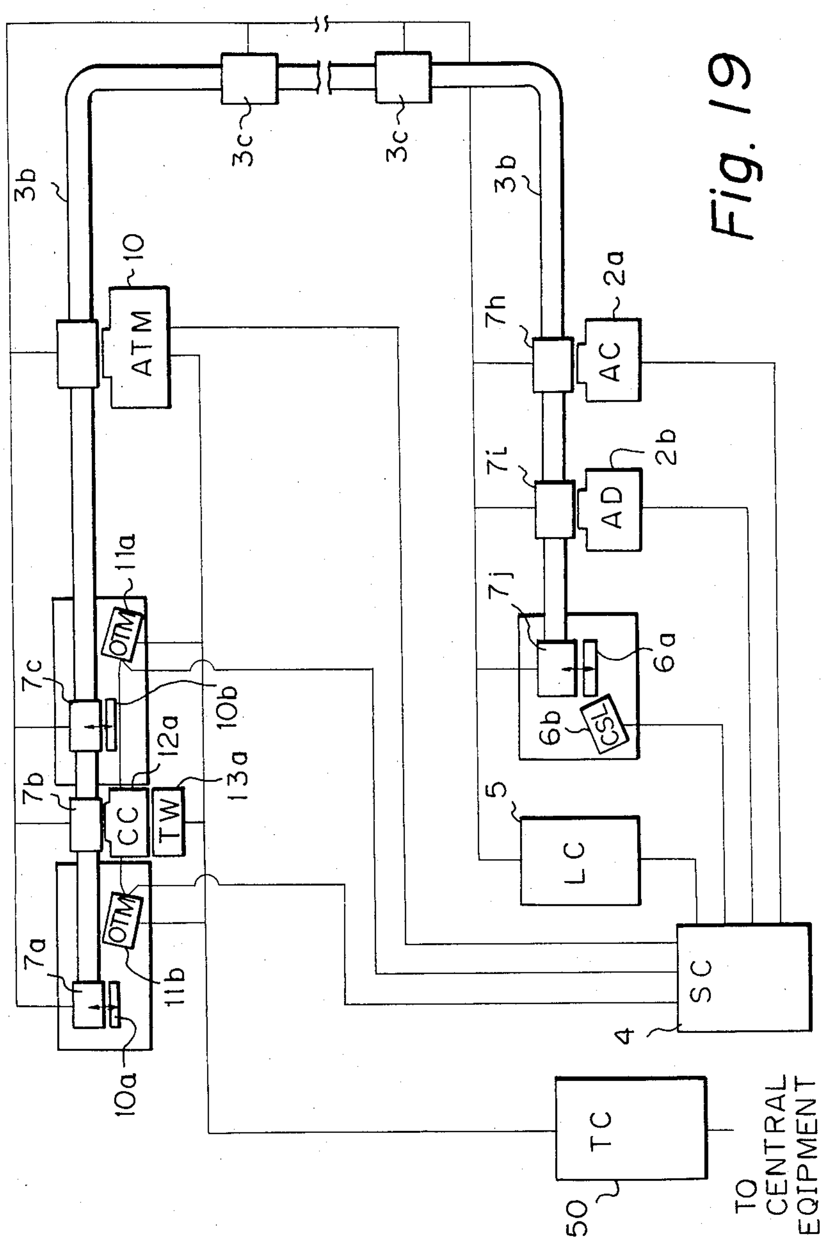

FIGS. 18 and 19 are diagrams illustrating another embodiment of the present invention, wherein FIG. 18 shows the appearance and FIG. 19 is a top view. In these drawings the same portions as those of previous embodiments are denoted by the same reference numerals.

Reference C denotes a counter provided in the bank or the like to divide the floor into a customers side and a bank working side. In this embodiment, a wicket counter 1 at which a wicket teller works and an automatic transaction machine (ATM) 10 are arranged on the counter C. At the wicket counter 1, therefore, the teller (the side facing you in FIG. 18) faces a customer via the counter 1. The automatic transaction machine 10 is contained in the counter C at a position separate from the wicket counter 1. Or, the automatic transaction machine 10 may be installed at the seam of the counter C. An operation panel equipped with a card insert port, cash discharging port and the like is arranged on the customers side (side facing away from you in FIG. 18).

The wicket counter 1 is equipped with a wicket apparatus (OTM) 11*a* which the teller manipulates to input the transaction data, and a cash handling port 10*a* through which the cash can be loaded or taken out by the teller. Close to the wicket apparatus 11*a*, a cash receiving machine 12*a* for the teller and a terminal writer 13*a* are provided.

A cashier portion consists of a cash holding machine 2*b* and a cash discharging machine 2*a* installed to the rear of the counter C. Close to the cashier machine, a cashier console 2 installed which operated by a bank clerk such as cashier. On the console 2 is provided a cash handling port 21*a* through which the cash can be taken out or loaded by the cashier. A carrier rail 3*b* runs between the cashier portion including the cashier console 2 and the wicket counter 1 passing through the automatic transaction machine 10. The carrier runs on the rail 3*b*.

FIG. 19 illustrates a structure similar to that of FIGS. 2 and 3, except that an automatic transaction apparatus 10 and a terminal control device 50 are provided. The wicket apparatuses 11*a* and 11*b* and the automatic transaction apparatus (ATM) 10 are connected to a terminal control device (TC) 50 and further connected to the central equipment. The wicket apparatuses 11*a*, 11*b* and the automatic transaction apparatus 10 are further connected to a system controller 4. The system controller 4 is connected to the carrier control apparatus 5, cashier console 2, and cashier machines 2*a* and 2*b*. That is, as the transactions are established at the wicket counter or the automatic transaction apparatus 10, the transaction request data is sent to the central equipment and the terminal control device 50. Based upon the message from the central equipment, the automatic transaction apparatus 10 executes the processing for disbursing or receiving the cash.

Also based on the message from the central equipment, the wicket counter sends data regarding the kind of receiving or disbursing transaction and the amount of the transaction to the system controller 4. Therefore, the system controller 4 issues instructions to hold or discharge the cash to the cashier machines 2*a* and 2*b*. At the same time, the controller 4 sends to the carrier control apparatus 5 instructions to move the carrier in accordance with the wicket counter where the request was made. According to these moving instructions, the carrier control apparatus 5 controls the movement of the carrier.

Figure 20:
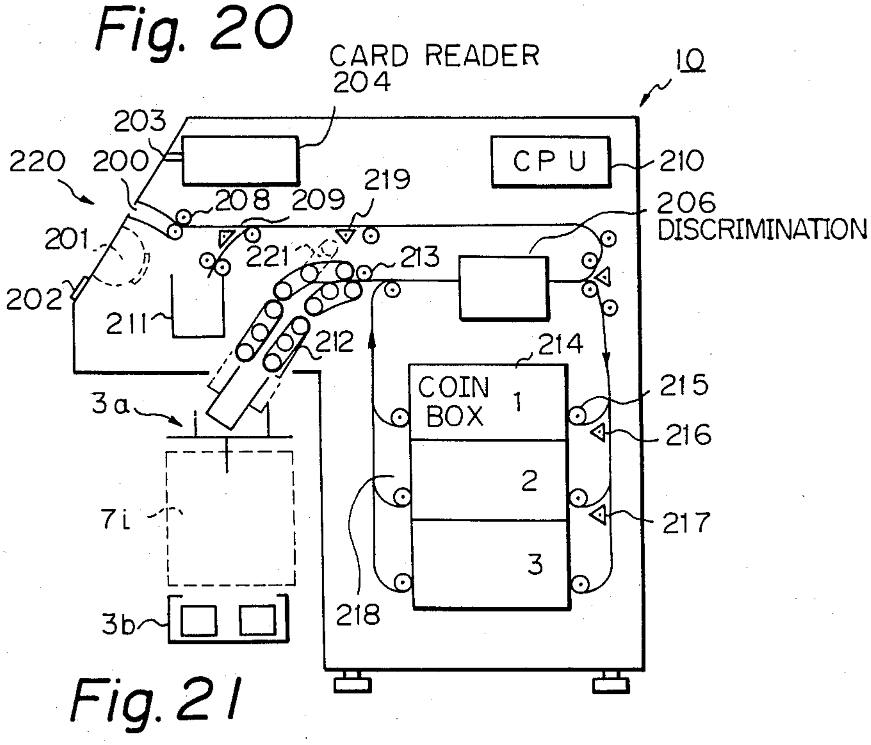
FIG. 20 is a diagram showing an automatic transaction apparatus 10 according to the embodiment of FIGS. 18 and 19.

FIG. 20 is a diagram showing the structure of the automatic transaction apparatus 10 which the customer manipulates to transact the cash. FIG. 20 shows an automatic cash (bill) disbursing machine (cash dispenser). However, this may be a transaction apparatus that enables the customers to deposit cash. The automatic transaction apparatus 10 is equipped with a cash holding portion 214 consisting of cash boxes for accommodating a plurality of kinds of bills that will be disbursed to the customers. On the operation panel 220 that will be manipulated by the customer are provided a card insert port 203, a bill discharge port 200, a display portion 201, and ten keys 202. In the cash holding portion 214 are provided cash holding mechanisms 215 and delivering mechanisms 218 for each of the cash boxes 1, 2, and 3. Reference numeral 212 denotes a cash take-out mechanism for taking out the cash carried by the carrier 3*a*. The take-out mechanism 212 consists of a pair of holding belts and the like, and is allowed to slide to the positions indicated by broken lines in FIG. 20. This make it possible to batchwisely take out the cash loaded on the bill holding box in the carrier 3*a*. The cash taken out by the take-out mechanism 212 is sent to a stage preceding a delivering mechanism 213. The cash is delivered one piece by one piece by the delivering mechanism 213, and the kind thereof is determined by a discriminating portion 206. Depending upon the determination of kinds by the discriminating portion, the gates 216 and 217 are selectively driven, and the cash is held into the cash boxes Nos. 1 to 3 of the cash holding portion 214. The cash which cannot be determined by the discriminating portion is distributed at the gates 207 and 209, and is rejected into a reject box 211.

The operation for taking out the cash from the carrier *3a* and holding the cash in the cash boxes is carried out at the time of replenishing the cash or at the time of initially setting the cash as will be described later. The take-out mechanism 212 works to load the cash onto the carrier at the time of calculating and recovering the cash. In this case, the cash is delivered from each of the cash boxes by the delivering mechanisms 218. The discriminating portion 206 counts the cash and the gate 219 distributes the cash. Namely, the cash from the cash boxes is loaded onto the carrier *3a* via carrier belts 121.

To input the transaction data, the customer manipulates the operation portion 220 in a same manner as a commonly known automatic transaction apparatus. Therefore, manipulation of the operation portion is not described here. The control unit 210 sends a transaction request message to the central equipment based upon the amount of disbursement input by the customer and the contents of the customer's card read by the card reader 204. In response to the message from the central equipment, the control unit 210 delivers the cash corresponding to the amount of disbursement by selectively driving the delivering mechanisms 218, and supplies the cash to the discriminating portion 206 which discriminates the kinds of cash in the same manner as described above. The cash (bills) that is favorably discriminated are carried toward the side of the cash (bill) discharge port 200. The cash that cannot be discriminated is rejected into the reject box 211 by the operation of the gate 209.

Figure 21:
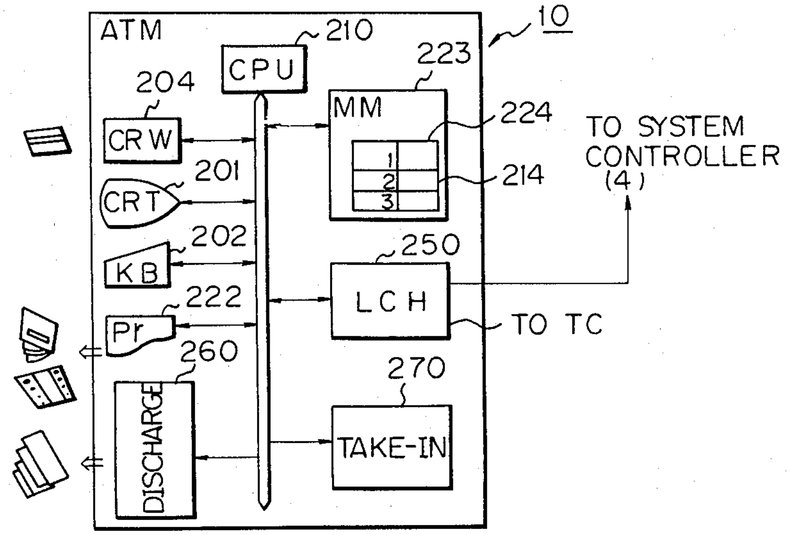
FIG. 21 is a block diagram of the automatic transaction apparatus according to the present invention.

In FIG. 21, the automatic transaction apparatus 10 is equipped with a processor 210 and a memory 223, and further has a card reader 204, a guidance display portion 201, a keyboard 202, and a printing portion 222. The automatic transaction apparatus 10 has also a disbursing mechanism 260 which consists of a delivering mechanism 218 (FIG. 20) discriminating portion 206, and gate 209, as well as a taking mechanism 270 which consists of a take-out mechanism 212 (FIG. 20) and the like, that are driven and controlled by the processor 210 which is connected in an on-line system to the terminal control device TC and to the central equipment via a circuit control portion 250. The processor 210 is also connected to the system controller 4 via a circuit. The memory 223 is provided with a transaction program as well as a cash counter 224 which controls the cash held in the holding portions (214) Nos. 1 to 3 (FIG. 20).

The automatic transaction apparatus 10 is manipulated by the customer and executes the disbursement transaction independently from the processing at the wicket. That is, the processor 210 of the automatic transaction apparatus 10 is triggered by the card that is inserted by the customer, and displays the manipulation guide on the display portion 201, communicates with the central equipment, and delivers and discharges the bills corresponding to the amount of disbursement input through the keyboard 202. The operation of the automatic transaction apparatus is widely known and is not closely described here. As the disbursement transaction is executed, the processor 210 renews (substracts) the cash counter on the memory 223 and controls the balance of cash (number of pieces or the amount) in its holding portion 214.

The system controller 4 generates the polling to the automatic transaction apparatus 10 after a predetermined period of time. Upon receipt of the polling, the processor 210 sends the counted value of the cash counter 224 back to the system controller 4. Therefore, a main processor in the system controller 4 renews the counted value in a cash counter controlled thereby and totalizes the amount with that executed (disbursed) by the automatic transaction apparatus 10. Further, the main processor renews the balance of cash of the automatic transaction apparatus 10. As the cash held in any one of the cash boxes of the cash holding portion 214 becomes smaller than a predetermined number of pieces, the main processor generates discharge instructions to the cash discharging machine *2a* (FIGS. 18 and 19) to discharge the cash of the corresponding kinds. The main processor further generates drive instructions to the carrier control apparatus 5 to move the carrier at the station of the automatic transaction apparatus 10 to the station of the cash discharging machine *2a*. Operations of the carrier control apparatus 5 and the cash discharging machine *2a* for these instructions are mentioned already in the foregoing. Therefore, the kinds of cash which are lacking in the automatic transaction apparatus 10 is loaded onto the carrier from the cash discharging machine *2a*.

As the completion of loading to replenish the cash is issued by the discharging machine *2a*, the system controller 4 issues to the carrier control apparatus 5 drive instructions to return the carrier. In response to the drive instructions, the carrier *3a* carrying the replenished cash comes to the position shown in FIG. 20. After the carrier *3a* has been returned, the system controller 4 issues instructions to the processor 210 of the automatic transaction apparatus 10 to take in the replenished cash. In responsive to the take-in instructions, the processor 210 drives the take-in mechanism 270.

The processor 210 is now under the condition where the transaction is not allowed, because of the lack of cash in the holding portion 214. The transaction is halted at a moment when the take-in instructions are received from system controller 4. If there is any transaction being handled, the transaction is halted after the transaction now being handled is completed.

The cash on the carrier *3a* is taken in by the operation of the take-in mechanism 270. That is, the take-out mechanism 212 moves to a position indicated by a broken line in FIG. 20 to hold the cash. The take-out mechanism 212 then returns to the position indicated by a solid line and causes the carrier mechanism such as rollers to operate, thereby to batchwisely carry the cash to a point just in front of the delivering mechanism 213 which delivers the replenished cash one piece by one piece. The bills are discriminated by the discriminating portion 206 in regard to their kinds and held in predetermined cash boxes in the holding portion 214. The processor 210 renews the cash counter 224 based upon the results of the discrimination from the discriminating portion 206. Therefore, it is confirmed that the cash box lacking the cash is replenished with cash, and the processor 210 is liberated from the condition where the transaction is halted.

In the above-mentioned embodiment, the balance of cash in the holding portion 214 is sensed by the system controller 4. However, it can also be contrived to sense the lack of cash by the automatic transaction apparatus 10. This obviates the need to sense the balance by the polling or to control the cash balance in the holding portion 114 by the system controller 4.

Further, the charge (replenish) of cash into the automatic transaction apparatus 10 can be instructed by the cashier console 2. This is chiefly employed, for example, when the cash is to be initially set to the holding portion 214 of the automatic transaction apparatus 10 at the time of initiating the operation of the system, i.e., at the time of initiating the work. In this case, the cashier clerk (hereinafter called cashier teller) first manipulates the keyboard (51 FIG. 18) of the cashier console 2 to charge the cash into the automatic transaction apparatus 10. That is, the cashier teller inputs the kinds and number of pieces of bills to be charged as well as addresses of the charging apparatus. The input data is sent to the system controller 4, which issues cash charging instructions to the automatic transaction apparatus 10, and further issues discharge instructions to the cash discharging machine 2*a* to discharge the designated cash. The system controller 4 further issues drive instructions to the carrier control apparatus 5 to drive the carrier.

Upon receipt of the cash charging instructions, the automatic transaction apparatus 10 waits for the reception of the coming cash take-in instructions. If the cash charging instructions are received while the transaction is being executed, after the transaction being handled is executed, transaction is halted, and the automatic transaction apparatus 10 waits for the reception of cash taken-in instructions from the system controller 4.

The cash discharging machine 2*a* which has received the discharge instructions delivers the cash of a designated amount. The delivered cash is then loaded onto the carrier based upon the loading structions from the system controller 4. Upon receipt of the completion of loading, the system controller 4 drives the carrier control apparatus 5 again to move the carrier to the automatic transaction apparatus 10. As described with reference to FIG. 20, the cash on the carrier 3*a* is taken out and held by the automatic transaction apparatus 10.

When the operation in the bank is finished, the cash is recovered from the holding portion 214 of the automatic transaction apparatus 10. That is, the cashier teller generates the recovery instructions from the console 2 to the system controller 4. Upon receipt of the recovery instructions, the system controller 4 generates the cash recovery instructions to the automatic transaction apparatus 10. If a plurality of transaction apparatuses 10 are installed, the cash recovery instructions are issued simultaneously to each. Due to these instructions, the automatic transaction apparatus 10 delivers the bills successively from the cash boxes Nos. 1 to 3 of the holding portion 214 (FIG. 20), and loads them onto the carrier 3*a* via the discriminating portion 206, gates 207 and 219, and carrier mechanism 221.

When as the loading of the cash is completed, the system controller 4 drives the carrier control apparatus 5, so that the carrier 3*a* is moved to the cash holding machine 2*b* to hold (recover) the cash. If a plurality of automatic transaction apparatuses are installed, the cash is successively held (recovered) from those whose carrier 3*a* has already been loaded with cash.

I claim:

1. A cash processing system comprising: a wicket terminal having a take-out port for taking out the cash; a cashier terminal for disbursing the cash; a carrier path connecting the wicket terminal to the cashier terminal; a carrier which runs on the carrier path; and a system controller which sends cash disbursing instructions to said cashier terminal in response to a cash disbursing request from the wicket terminal, so that said carrier carries the cash disbursed by the cashier terminal; wherein said system controller further comprises memory means which stores the cash disbursing request sent from the wicket terminal; and control means which transfers said carrier to the wicket terminal from where the cash disbursing request is executed, when initialize instructions are issued during the cash disbursement processing being executed in response to the cash disbursing request.

2. A cash processing system according to claim 1, wherein said carrier is driven by a linear motor, and said wicket terminal is provided with a lifting mechanism which is adapted to lift the carrier from the carrier path to the position of said cash take-out port.

3. A cash processing system according to claim 1, wherein said carrier has containers for containing coins and bills, and cover for automatically opening and closing the containers.

4. A cash processing system according to claim 1, wherein a plurality of said wicket terminals are provided in a counter where wicket tellers are positioned, and said cashier terminals are installed to the rear of the wicket tellers and spaced therefrom.

5. A cash processing system according to claim 1, wherein said cashier terminal has cash boxes for separately holding coins and bills, and further has a loading mechanism which automatically loads the coins and bills discharged from the cash boxes onto the carrier depending upon the instructions from the system controller.

6. A cash processing system according to claim 1, wherein said system controller includes memory means which stores the progressing conditions of the cash disbursement including the position of carrier and the step of cash disbursing operation by the cashier terminal carried out in response to the request for disbursing the cash, and further includes means which continues the cash disbursement processing that is under execution based on the progressing conditions that are stored in said memory means, when initialize instructions are issued.

7. A cash processing system according to claim 1, wherein said memory means consists of a non-volatile memory.

8. A cash processing system according to claim 1, wherein said system controller includes means which receives requests for disbursing the cash from a plurality of said wicket terminals, and further includes means which, when initialize instructions are issued, cancels the requests issued from the other wicket terminals than the wicket terminal corresponding to the cash disbursement processing under execution.

9. A cash processing system comprising:

a cash receiving machine including an insertion port for inserting the cash therein, counting means for counting the amount of cash inserted into said insertion port, and a loading mechanism for automatically loading onto a carrier the cash that is counted by said counting means; a cashier terminal having cash boxes for holding the cash counted by said cash receiving machine; a carrier path connecting said cash receiving machine to said cashier terminal; and a carrier controller which controls the movement of said carrier along said carrier path; wherein said cash receiving machine is provided with pool means for temporarily storing the cash counted by said counting means.

10. A cash processing system according to claim 9, wherein said cashier terminal is equipped with a lifting mechanism which separates the carrier, loaded with the cash by the cash receiving machine, away from the carrier path, and a take-out mechanism which automatically takes out the cash, carried by the carrier, to hold the cash in a cash box.

11. A cash accommodating system comprising:

a wicket cash receiving machine including an insertion port for inserting therein the cash received through a deposit transaction, a counting portion for counting the cash inserted into said insertion port, and a pool portion for temporarily storing the counted cash;

a cash holding machine provided separately from the wicket cash receiving machine, for batchwisely holding the cash stored in the pool portion of the wicket cash receiving machine;

detection means for detecting a predetermined amount of cash having been held in the pool portion of the wicket cash receiving machine, based on the counted result of said counting portion; and carrier means for carrying the cash stored in said pool portion to said cash holding machine, response to a detect signal from said detection means.

12. A cash holding system according to claim 11, wherein said detection means includes means for detecting the received cash that is nearly fully stored in the pool portion of the wicket cash receiving machine, and an output of said detection means is adapted to activate the cash carrying instructions which should be issued to the carrier device, and to initiate the cash holding operation in the cash holding machine.

13. A cash holding system according to claim 11, wherein said carrier device is controlled by a system controller that issues instructions for carrying, and wherein said system controller comprises: means for receiving notice of the amount of cash inserted into the wicket cash receiving machine; a temporary counter for storing the amount of cash contained in the pool portion of the wicket cash receiving machine; a total counter for storing the cash contained in the cash holding machine; and control means for adding the content of said temporary counter to said total counter and clearing said content of said temporary counter, when the cash contained in the pool portion of the wicket cash receiving machine is carried to the cash holding machine by said carrier device.

14. A cash holding system according to claim 11, wherein said wicket cash receiving machine includes an insertion port for inserting therein the bills and coins, means for counting the amounts of bills and coins inserted therein, and at least a pair of pool means for separately containing the counted bills and coins, respectively, wherein said detection means is provided for each of the pool means.

15. A cash processing system comprising a wicket terminal where the cash will be handled, a cashier terminal having cash boxes into which the cash will be inserted or from which the cash will be taken out, and a carrier which moves on a carrier path connecting these terminals so as to carry the cash, wherein said wicket terminal includes: at least two stations where the carrier will stop; a cash take-out port directly accessible to the carrier, and a cash insertion port into which the cash can be inserted; and means for automatically loading the carrier with the cash inserted into the insertion port; wherein said stations where the carrier will stop are provided at the positions corresponding to said cash take-out port and said cash insertion port.

16. An article carrier system comprising: a wicket terminal where articles such as cash will be handled by a wicket teller; an automatic transaction apparatus that will be operated by a customer; cashier terminal for receiving or taking out the articles that will be handled by said wicket terminal or said automatic transaction apparatus; a carrier path connecting the wicket terminal and the automatic transaction apparatus to the cashier terminal; and a carrier which runs on the carrier path so as to carry the articles discharged from the cashier terminal to the wicket terminal or to the automatic transaction apparatus; wherein said wicket terminal is provided with an input device to request the discharge of articles; said automatic transaction apparatus is provided with an article holding portion to hold the articles that are to be handled by itself and means for detecting the amount of articles held in said article holding portion; and a system controller is provided to discharge and carry the articles according to the requests for discharging articles issued from the wicket terminal, and to supply the articles to the automatic transaction apparatus, when the article holding portion of the automatic transaction apparatus becomes nearly empty.

17. An article carrier system according to claim 16, wherein said wicket terminal has a handling port through which the articles can be directly put into or taken out from the carrier, and the cashier terminal has a holding portion for holding the articles that are to be held in accordance with the requests from the wicket terminal.

18. An article carrier system according to claim 16, wherein a plurality of said wicket terminals are provided in a wicket counter in a bank or the like organ, and said automatic transaction apparatus is incorporated in said wicket counter as a unitary structure.

19. An article carrier system according to claim 16, wherein said system controller has polling means which periodically senses, at a predetermined time interval, the amount of articles held in the article holding portion of the automatic transaction apparatus.

20. An article carrier system according to claim 16, wherein said automatic transaction apparatus includes means for automatically taking out the articles carried by the carrier and automatically holding them in the article holding portion.

* * * * *